(No Model.)
B. S. WHITEHEAD.
BICYCLE.
No. 341,526. Patented May 11, 1886.
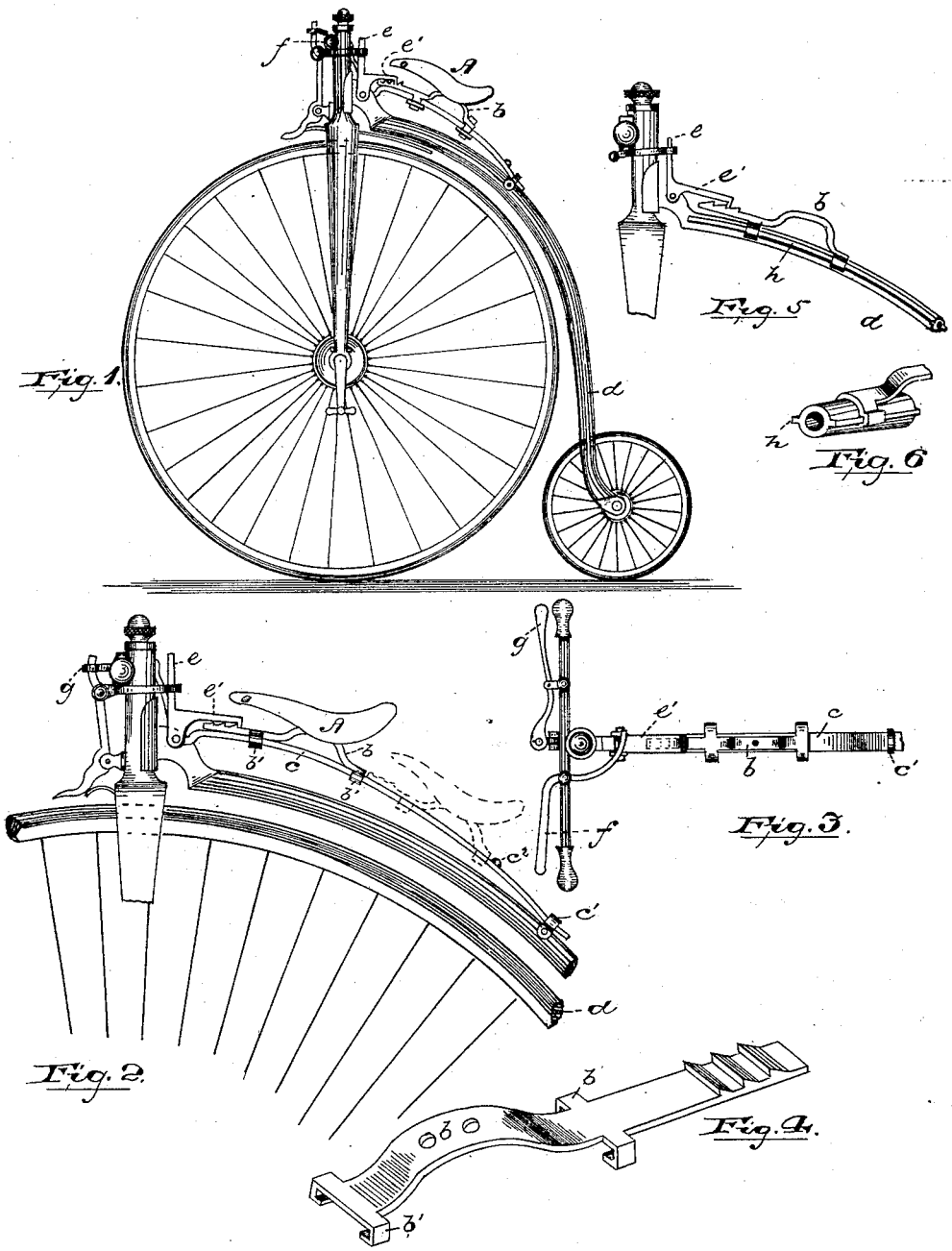
WITNESSES:
B. L. McNulty
Fredk. F. Campbell
INVENTOR:
Benjamin S. Whitehead,
BY Drake & Co ATTYS
N. PETERS, Photo-Lithographer, Washington, D. C.

UNITED STATES PATENT OFFICE.

BENJAMIN S. WHITEHEAD, OF NEWARK, NEW JERSEY.

BICYCLE.

SPECIFICATION forming part of Letters Patent No. 341,526, dated May 11, 1886.

Application filed September 5, 1885. Serial No. 176,235. (No model.)

*To all whom it may concern:*

Be it known that I, BENJAMIN S. WHITEHEAD, a citizen of the United States, residing at Newark, in the county of Essex and State of New Jersey, have invented certain new and useful Improvements in Adjustable Bicycle-Saddles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

One of the greatest inconveniences and annoyances which attends bicycle-riding is the constant liability on the part of the rider to take a "header," to the imminent danger of life and limb, in descending a hill or "coasting," in striking or riding over an obstruction, or in stopping suddenly. This is the most serious objection to the bicycle known as the "crank-machine," in which the large or driving wheel is forward of the smaller wheel, and which detracts from its usefulness. When constructed in the ordinary manner, and as usually ridden, the saddle is back of the center of gravity of the large wheel; but it is not placed far enough back to prevent a header under unusual circumstances, which require an adjustment of the saddle to counteract the forward tendency of the rider. This has been partially accomplished by constructing a seat which is capable of adjustment when the rider is not upon the machine, or, if in the saddle, compelling him to dismount to make the required change. This evidently is not adapted to meet those circumstances when such an action is most needed, as accidents occur when the rider is in the saddle, and it is then that some provision for safety is necessary. This is accomplished by my invention, which consists of the combination, with a bicycle-saddle, of suitable mechanism whereby the saddle, while the rider is seated thereon, is allowed or caused to fall or slip backward to any desired distance, thereby changing the center of gravity to about midway between the wheels.

In the drawings, Figure 1 is a side elevation of a bicycle having one arrangement of my improvement attached thereto. Fig. 2 is an elevation in detail, enlarged, of the construction shown in Fig. 1. Fig. 3 is a plan of a portion of Fig. 2, with the saddle removed. Fig. 4 is a perspective view of the sliding frame. Fig. 5 is a side elevation of a portion of a bicycle illustrating a modified construction, and Fig. 6 is a perspective view of the sliding connection of the sliding frame on the backbone.

Parts corresponding are indicated by similar letters.

In constructing the mechanism which is adapted to carry out my conception, I prefer to so arrange it that that portion of the device which controls its operation shall be within convenient reach of the hand while upon the handle-bars, which is the normal position of the hands; or the said operating portion of the mechanism may be situated within reach of the right hand, which is often removed from the handle-bar for various purposes, the left hand being almost constantly upon the handle-bar.

In Figs. 1, 2, 3, and 4 is shown what is considered the most practical method of arranging and constructing my invention, which is consequently the preferred mechanism.

A in said figures indicates the saddle, which is secured to a sliding frame, *b*, which moves backward and forward upon an elastic strip or spring, *c*, as illustrated in Figs. 1, 2, and 4, or upon the backbone *d*, as shown in Figs. 5 and 6, or any equivalent arrangement. The spring *c* is secured to the backbone or the head and extends backward along the backbone, on which the end rests, sliding freely under a collar, *c'*. As indicated in the drawings, the spring-piece conforms approximately to the curvature of the backbone, being, however, preferably raised a little near the head to secure a greater slope. The lower end of the spring may be secured to the backbone, instead of sliding under the collar *c'*. The sliding frame *b*, which moves upon said spring, is illustrated in Fig. 4, and is provided with guides *b'*, which hold the said frame upon the spring. One end of the frame projects forward of the pommel of the saddle, and is provided with ratchets, perforations, hooks, or other similar devices, with which the holding or detaining mechanism engages, as indicated in Fig. 2. A stop, $c^2$, upon the spring limits the extent of the backward movement of the sliding frame.

While I prefer to form the sliding frame and saddle separately and secure the one to the other, still the saddle itself may slide directly upon the spring-piece and be held thereon by grooved pieces embracing the spring, similar to the guides $b'$, which may be cast integrally with the saddle-body or otherwise secured thereto. An arm having ratchets or stops thereon may be similarly attached to the saddle to engage with the detaining mechanism.

The holding or detaining mechanism may be constructed in various ways, that shown in the drawings consisting of a bell-crank or lever, $e$, pivoted to the head or backbone, one arm of which, $e'$, is hooked to engage with the ratchets on the sliding frame; the other end, $e$, extending up along the head, engages with an operating or hand lever, $f$, which is pivoted to the left handle-bar. The brake-operating lever $g$ is pivoted to the right handle-bar. The lever $f$ for operating the detaining mechanism may be dispensed with and the lever $e$ operated directly by the hand. This holding mechanism may be used when the sliding frame moves directly upon the backbone, as shown in Figs. 5 and 6, in which lugs $h$ are formed upon said backbone, and the sliding frame fitted around the same, as indicated in Fig. 6.

As other methods of constructing the backbone and sliding frame to adapt them to operate as intended may be devised, I do not wish to limit myself to the mechanism shown.

When the saddle and sliding frame move directly upon the backbone, to provide sufficient elasticity for comfort in riding I arrange springs suitably placed between the saddle and the sliding frame.

In changing the position of the saddle the lever $f$ is pressed toward the handle-bar, and, acting upon the bell-crank, lifts the hooked arm $e'$ out of the ratchets. This releases the sliding frame and saddle, which, impelled by the weight of the rider, slides automatically backward and downward until checked by the stop $c^2$, which may be formed on the spring, as indicated in the drawings, or the collar $c'$, that holds the end of the spring in place, may act as a stop. The saddle is returned to its ordinary riding position near the head by the rider drawing himself up toward the head, and the saddle, or the projecting arm thereon, engages automatically with the catch $e'$ on the bell-crank, and holds the saddle in its normal riding position near the head. I prefer to return the saddle to its ordinary position in this manner rather than raise it by means of mechanical devices, as it avoids complicated mechanism and is very easily accomplished, requiring but little exertion on the part of the rider to draw the saddle up toward the head or bars.

One of the advantages resulting from the use of the adjustable saddle, and which will be appreciated by riders, is that the brake can be "put on" very suddenly without throwing the rider, from the fact that the lever $f$ can be operated and the saddle changed as quickly as the brake can be applied, the backward movement of the one counteracting the forward tendency of the other.

In ascending a steep grade the saddle is adjusted in its highest forward position, while in descending the saddle is permitted to slide backward to its farthest limit, or to any intermediate point, as desired, both of which may be done without dismounting. Furthermore, mounting or dismounting may be done with as much safety on a steep grade as on a level.

With the sliding saddle those machines having the large or steering wheel in front are as safe as those which are particularly designed and constructed for safety, yet retain all of the desired qualities of the crank-machine.

In those saddles which have been heretofore designed to be shifted to change the center of gravity the movement of the saddle is in a horizontal direction, and consequently the saddle must be moved backward and forward by the operation of suitable mechanism, and not by its own gravity. To move the saddle by any extraneous means requires considerable time and effort, and would completely nullify the most desirable and indispensable quality in a shifting saddle—viz., quickness of movement. By my arrangement and construction the saddle drops instantly by its own weight, and also, assisted by the weight of the rider, downward and backward, away from the head of the bicycle, upon the spring. In addition to the rapidity of movement of the gravity-saddle, and its consequent advantages, the forward tendency of the rider is more positively counteracted by lowering the center of gravity, which is accomplished by the downward movement of the saddle.

Having described my invention, I desire to claim the following:

1. In a bicycle, the combination of a downwardly-inclined spring, a saddle moving freely upward and downward on said spring independent of and separate from any operating mechanism, and a stop on said spring to limit the downward movement of the saddle, substantially as and for the purposes set forth.

2. In a bicycle, the combination of a downwardly-inclined spring, a saddle moving freely upward and downward on said spring independently of and separate from any operating mechanism, a stop on said spring to limit the downward movement of the saddle, and a catch constructed and adapted to automatically engage with and hold the said saddle as it is raised from its lowest riding position to its normal riding position near the head by the movement of the body, substantially as and for the purposes set forth.

3. In a bicycle, in combination, a saddle, a sliding frame to which the saddle is secured, and with which it moves, and provided with a projecting arm having stops thereon, a spring-piece, upon which the sliding frame moves, secured to the backbone of the bicycle and conforming approximately to the curvature thereof, and provided with a stop thereon to limit the downward movement of the saddle, a bell-crank or lever pivoted near the bicycle-head, one arm of which is adapted to engage automatically with the projecting arm of the sliding frame, and an operating-lever engaging with the other arm of said bell-crank, all said parts being arranged and operating for the purpose set forth.

4. In a bicycle, in combination, a sliding frame having ratchets thereon, a saddle secured to said sliding frame, and a lever or detaining-piece engaging with said ratchets, for the purposes set forth.

5. In a bicycle, in combination, a spring, a sliding frame moving on said spring and having ratchets thereon, a saddle secured to said sliding frame, and a detaining lever or piece adapted to engage with said ratchets, for the purposes set forth.

6. In a bicycle, in combination, a spring, a sliding frame moving on said spring and having ratchets thereon, a saddle secured to said sliding frame, a detaining-lever, and an operating-lever, for the purposes set forth.

In testimony that I claim the foregoing I have hereunto set my hand this 28th day of August, 1885.

BENJAMIN S. WHITEHEAD.

Witnesses:
    FREDK. F. CAMPBELL,
    CHARLES H. PELL.